April 14, 1964 S. E. NORCROSS 3,128,925
GRAVITY LIQUID FEEDER WITH HEADLOSS EQUALIZER
Filed Oct. 23, 1961
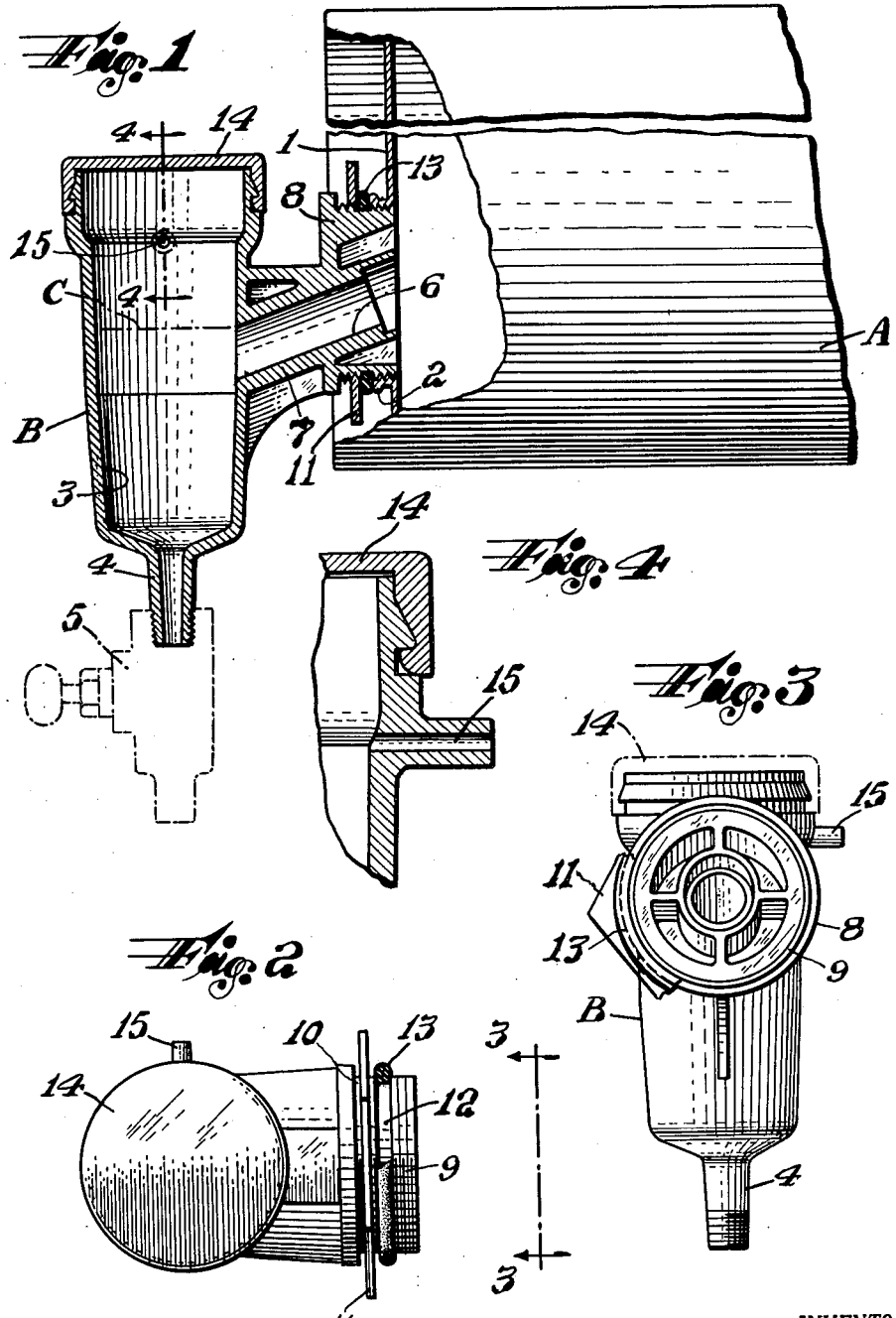
INVENTOR.
Sterling E. Norcross
BY
Harry B. Cook,
ATTORNEY

United States Patent Office 3,128,925
Patented Apr. 14, 1964

3,128,925
GRAVITY LIQUID FEEDER WITH HEADLOSS EQUALIZER
Sterling E. Norcross, 19 Osborne St., Bloomfield, N.J.
Filed Oct. 23, 1961, Ser. No. 146,832
3 Claims. (Cl. 222—442)

This invention relates in general to a device for permitting the gravity discharge of liquid from a closed container such as a steel drum at a constant rate regardless of variations in the amount of liquid in the drum so that the liquid can be fed or transferred from the container to the desired point of use at a predetermined rate of flow.

One object of the invention is to provide a device of this character which shall embody novel and improved features of construction to compensate for the loss of static head as the level of the liquid drops from the highest to the lowest point, for example, from a full tank to an empty tank.

Another object is to provide such a device which shall include a casing having a headloss compensating chamber and means for connecting the casing to the bung collar of a liquid-containing drum with said chamber in communication with the interior of the drum in such a way that the amount of air to compensate for any outflow of a given quantity of liquid shall be admitted into the drum as the liquid is discharged, thereby to cause a partial vacuum above the liquid in the tank, or, in effect, to establish a hydrostatic balance between the liquid in the drum and the liquid in the casing.

Other objects, advantages and results of the invention will be brought out by the following description in conjunction with the accompanying drawings in which FIGURE 1 is a central vertical sectional view through a gravity liquid feeder with headloss equalizer, showing the same connected to the bung collar in the head wall of a drum which is fragmentarily illustrated;

FIGURE 2 is a top plan view of the feeder detached from the drum;

FIGURE 3 is a side elevation of the feeder taken from the plane of the line 3—3 of FIGURE 2; and FIGURE 4 is an enlarged fragmentary vertical sectional view on the plane of the line 4—4 of FIGURE 1.

As hereinbefore indicated, the feeder embodied in the invention is intended to be connected to an opening such as a bunghole of a container, for example a steel drum, that is otherwise closed so that the feeder constitutes the only outlet for the liquid from the drum and the only inlet of air into the drum.

Referring particularly to the drawings, the reference character A designates a sealed drum of known construction having an end wall 1 in which is a bunghole formed by a bung collar 2. The container or drum is shown as laid on its side with the bunghole at the lower side of the drum, but it will be understood that the container may be of other shapes and the important consideration is that the bunghole be located in the lower portion of the wall of the container so that the liquid will flow by gravity.

The feeder embodying the invention comprises a casing B in which is an elongated vertically disposed chamber 3 that has an outlet tube or nipple 4 approximately on the axis of the chamber to which may be connected a suitable control valve 5 that is shown in broken lines for controlling the flow of the liquid from the chamber into a receptacle or into a discharge line. The chamber 3 has an inlet passage 6 opening laterally from the chamber through an inlet nipple 7 that is shown as formed integrally with the walls of the chamber 3. The inlet nipple 7 extends upwardly from the chamber at an angle to the horizontal which may be of the order of from 10 degrees to 45 degrees, preferably 20 degrees. At the end of the nipple 7 is an adaptor or coupling member 8 through which the inlet opening extends, the adaptor being shown as comprising a screw-threaded plug having a series of threads 9 to screw into the threads of the bung collar 2 and also having another series of threads 10 on which is threaded a nut 11 for clamping the feeder in the bung collar. Between the two series of threads 9 and 10 is a groove 12 in which is disposed an O-ring 13. When attaching the feeder to the drum, the threads 9 are screwed into the bung collar until the O-ring abuts the outer end of the bung collar, whereupon the nut 11 is tightened against the O-ring, thereby making possible positive vertical positioning of the chamber 3 and the locking of the feeder in the drum in air-tight and liquid-tight relation to the interior of the drum.

The top of the chamber 3 may be left open, but preferably it is closed by a snap cover 14 to prevent the entry of foreign matter into the chamber. When the cover is omitted, no other air vent is required, but where the cover is utilized, it is desirable to have an air vent duct 15 leading outwardly from the chamber 3 above the inlet passage 6.

With this construction, when the feeder is attached to a drum containing liquid, the level of which is above the inlet passage 6 when the axis of the chamber 3 is vertical, the liquid will flow from the drum through the inlet passage so that the level of the liquid in the chamber will be coincidental with the upper point of intersection of the upper side of the inlet passage with the wall of the chamber 3, the normal liquid level being shown by the broken line C in FIGURE 1. The inlet passage is so disposed with respect to the container and the chamber so that the lowermost edge portion of the passage connected to the container is at the same level or above the level of the uppermost edge portion of the passage at its point of connection to the chamber. When the liquid is permitted to flow out the chamber 3, as by opening of the valve 5, the liquid level C will momentarily drop and air from above the liquid level will flow through the inlet passage 6 into the container or drum A and thereby compensate for the amount of liquid withdrawn. Thus, the loss of head due to the withdrawal of liquid from the container will be compensated by the incoming air so that there will be a constant rate of flow of liquid from the chamber 3 regardless of the level of the liquid in the container. The control means such as the valve 5 may be adjusted to discharge the liquid drop-by-drop or in a continuous stream, but in all cases the headloss will be compensated. Therefore, the container may be set up for use in any desired location and may be left for unattended operation once the flow-rate has been determined by the control means such as the valve 5.

It will be understood by those skilled in the art that the location of the control means in the chamber may be varied as desired. For example, the cap might be rotatably mounted on the casing and have a needle valve head to cooperate with a valve seat in the outlet nipple 4, and of course the control valve could be remotely related to the chamber, for example, in a discharge line, or at a remote point.

The size of the chamber 3 and its outlet and the diameter of the inlet 6 may vary depending upon the volume of flow desired from the drum through the chamber and the outlet. For most purposes the length of chamber 3 from the outlet to the top edge of the inlet passage 6 may be of the order of three inches and its diameter may average about two inches, while the diameter of the inlet passage may be of the order of one-half an inch.

The position and form of the air vent may vary also, and if desired, the stem of the needle valve above-mentioned could be made tubular provided with an air vent orifice above the liquid level in the chamber 3.

Many modifications and changes in the shape and construction of the feeder casing, inlet nipple and adaptor 8 will occur to those skilled in the art as within the spirit and scope of the invention.

I claim:

1. In a gravity feeder for dispensing selected quantities of liquid from a selectively air tight container, the combination comprising:
   (a) a casing;
   (b) means defining a substantially vertically disposed chamber within said casing;
   (c) means defining an inlet passage interconnecting the interior of said container and said chamber at a point intermediate the ends of said chamber,
   (d) said inlet passage disposed in an upwardly and outwardly extending attitude with respect to said chamber such that the lowermost edge portion of the upper outer end of said passage connected to said container is at the same level or above the uppermost edge portion of the end of passage connected to said chamber;
   (e) means defining a liquid dispensing outlet in said casing;
   (f) vent means in said casing interconnecting said chamber and atmosphere at a point above the interconnection of said inlet passage and said chamber; and
   (g) a fluid tight feeder connection between said inlet passage and said container.

2. In a gravity feeder for dispensing selected quantities of liquid from a selectively air tight container, the combination comprising:
   (a) a casing;
   (b) means defining a substantially vertically disposed chamber within said casing;
   (c) means defining an inlet passage interconnecting the interior of said container and said chamber at a point intermediate the ends of said chamber,
   (d) said inlet passage disposed in an upwardly and outwardly extending attitude with respect to said chamber such that the uppermost edge portion of the upper outer end of said passage connected to said container is at the same level or above the uppermost edge portion of the end of said passage connected to said chamber;
   (e) means defining a liquid dispensing outlet in said casing;
   (f) vent means in said casing interconnecting said chamber and atmosphere at a point above the interconnection of said inlet passage and said chamber;
   (g) a fluid tight feeder connection between said inlet passage and said container,
   (h) said fluid tight feeder connection including an externally threaded connector receivable in said container;
   (i) a packing ring mounted on said connector for disposition against a face of said container; and
   (j) an internally threaded nut mounted on said connector between said packing ring and said casing, said nut adapted to press said packing ring into a sealing disposition against said container face to provide a fluid tight connection between said connector and said container and to lock said casing against rotation in said container.

3. The invention defined by claim 2 wherein said inlet passage is inclined with respect to the chamber at an angle between 45 degrees and 80 degrees.

References Cited in the file of this patent
UNITED STATES PATENTS

| | | |
|---|---|---|
| 718,764 | Hutchings | Jan. 20, 1903 |
| 953,027 | Fate | Mar. 29, 1910 |
| 2,889,733 | Vanderhoof | June 9, 1959 |